(12) United States Patent
Smith et al.

(10) Patent No.: US 11,608,874 B2
(45) Date of Patent: Mar. 21, 2023

(54) ROCKER JOINT ROLLER CHAIN

(71) Applicant: CeramicSpeed Sport A/S, Holsterbro (DK)

(72) Inventors: Jason Smith, Boulder, CO (US); Alexander Jacobson Rosenberry, Lakewood, CO (US)

(73) Assignee: CeramicSpeed Sport A/S, Holstebro (DK)

( * ) Notice: Subject to any disclaimer, the term of this patent is extended or adjusted under 35 U.S.C. 154(b) by 217 days.

(21) Appl. No.: 17/181,005

(22) Filed: Feb. 22, 2021

(65) Prior Publication Data

US 2022/0268336 A1    Aug. 25, 2022

(51) Int. Cl.
*F16G 13/06*    (2006.01)

(52) U.S. Cl.
CPC .................................... *F16G 13/06* (2013.01)

(58) Field of Classification Search
CPC ....................................................... F26G 13/06
USPC ........................................................ 474/229
See application file for complete search history.

(56) References Cited

U.S. PATENT DOCUMENTS

| 4,186,617 | A | 2/1980 | Avramidis et al. | |
| 6,572,504 | B2* | 6/2003 | Wakabayashi | F16G 13/04 |
| | | | | 474/215 |
| 2007/0298922 | A1* | 12/2007 | Triller | F16G 13/02 |
| | | | | 474/215 |
| 2014/0171246 | A1* | 6/2014 | Ritz | F16G 13/06 |
| | | | | 474/206 |
| 2015/0211603 | A1* | 7/2015 | Koschig | F16G 13/06 |
| | | | | 474/229 |
| 2020/0158208 | A1 | 5/2020 | Ribeiro et al. | |

* cited by examiner

*Primary Examiner* — Gene O Crawford
*Assistant Examiner* — Emily R Kincaid
(74) *Attorney, Agent, or Firm* — Kilpatrick Townsend & Stockton LLP

(57) ABSTRACT

A bicycle chain includes a pair of outer plates, a pair of inner plates, and a connecting pin assembly. The pair of outer plates defines a width of the bicycle chain in a transverse direction, and the pair of inner plates is positioned at least partially between the pair of outer plates. The connecting pin assembly connects the pair of outer plates with the pair of inner plates and includes a first rocker pin, a second rocker pin, and a center pin between the first rocker pin and the second rocker pin in a longitudinal direction. A length of the center pin in the transverse direction is less than the width of the bicycle chain.

20 Claims, 21 Drawing Sheets

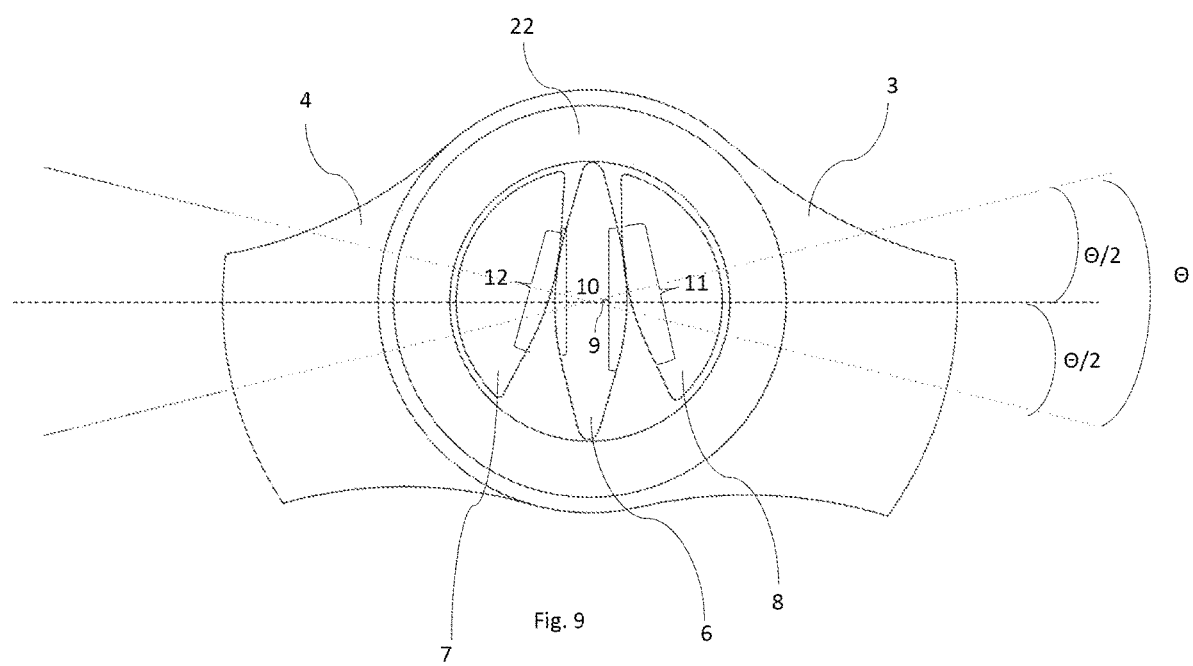

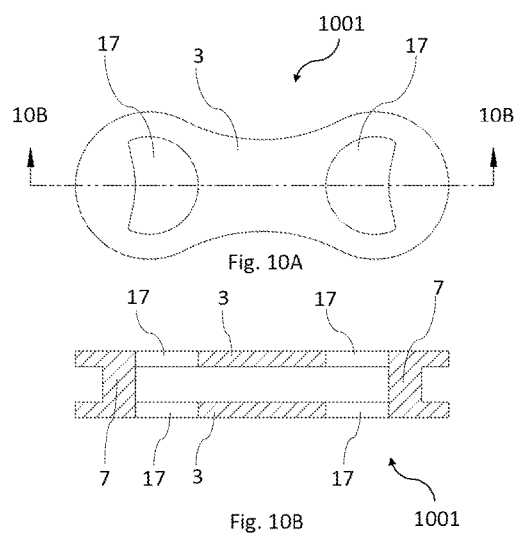
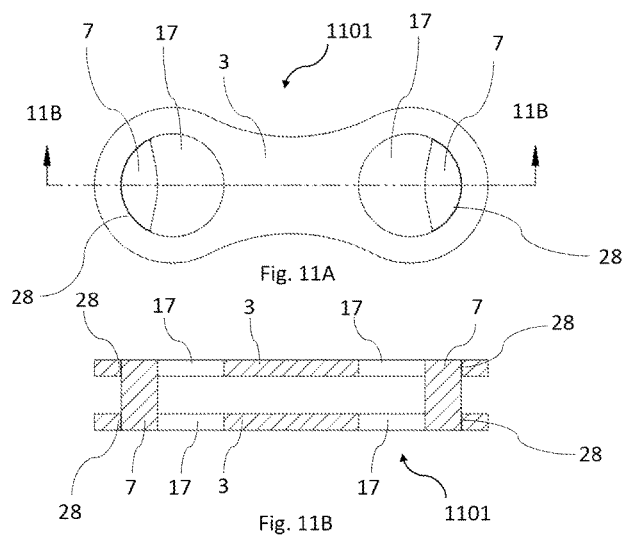

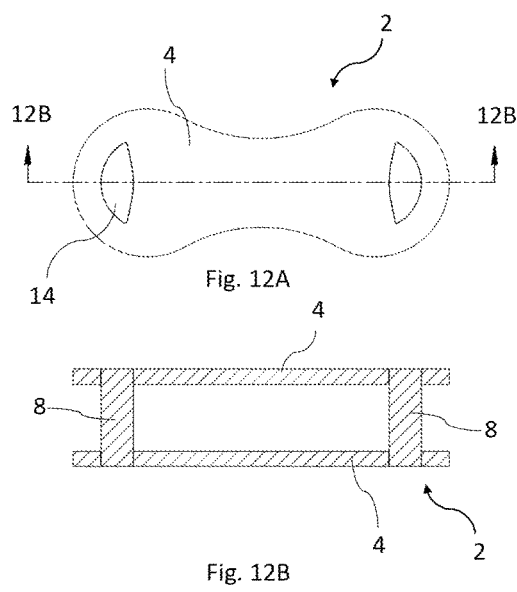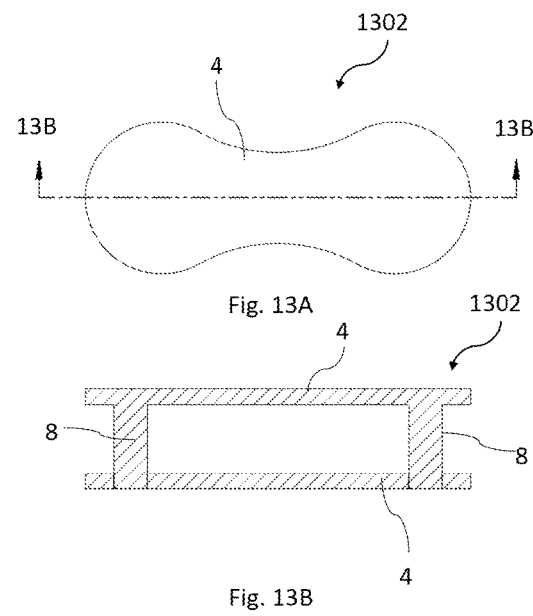

Fig. 19A
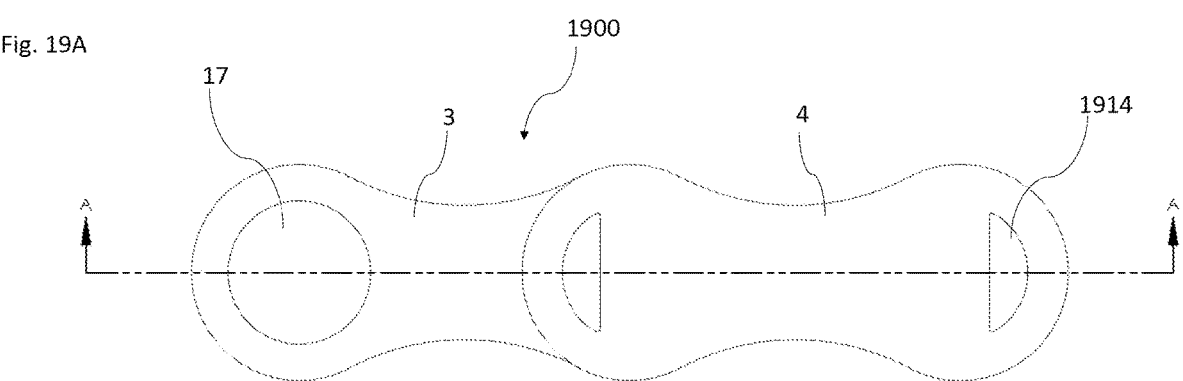
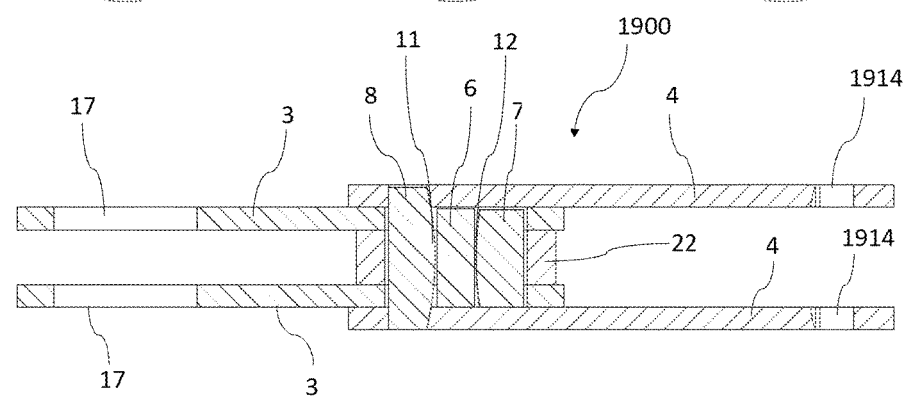
Fig. 19B

ROCKER JOINT ROLLER CHAIN

FIELD OF THE INVENTION

This application relates to a chain for a bicycle, and, more particularly, to a chain with rocker joints for a bicycle.

BACKGROUND

Many modern multi-gear bicycle drivetrains use bushing-roller style chains that are specifically designed for the bicycle drivetrain application. Such existing chains may be effective at transferring power in certain scenarios, but overall suffer from several drawbacks. For example, bushing-roller style chains may have a high wear rate due to internal sliding surfaces between the components of the chain. These sliding surfaces also create a high degree of friction in the chain, when used on a bicycle. Although, existing silent chains may create a lower degree of friction in the chain, these chains offer only limited articulation for the links of the chains, and therefore cannot be used on a bicycle. Also, existing silent chains with rocker pins do commonly include parts of the chain pins or chain accessories that protrude transversely beyond an outer surface of outer plates and are obstructive because these parts can come into contact in an undesirable and disruptive manner with an adjacent sprocket. Additionally, existing silent chains with rocker pins do not allow for chain skew in a transverse direction and are not able to operate under a high degree of lateral sprocket misalignment, and thereby cannot be used as bicycle chains. Prior art U.S. Pat. No. 6,572,504 by Wakabayashi describes an inverted tooth silent chain utilizing a center pin positioned between two outer rocking pins at the joint of rotatable articulation. However, in order for Wakabayashi's invention to properly function it is a necessity to incorporate a set of inboard and outboard external washers affixed to the center pin. The external washers are used to stabilize the center pin, and thereby avoid disassembly of the chain. Modern multi-gear bicycle chains need to be very narrow to fit between the closely spaced sprockets on the rear multi-sprocket cassette to avoid interference with the adjacent sprockets on the cassette. Therefore, external washers cannot be used on a bicycle chain because the width of the chain will be too great to fit on a multi-sprocket cassette. U.S. Pat. No. 4,186,617 by Avramadis describes a hybrid rocker joint roller chain, which uses a roller to possess the ability to engage with the roller-receiving sprocket teeth, yet the hybrid chain replaces the traditional round pin and bushing rotational sliding elements with a pair of higher-efficiency rocking pins at the internal rotatable joint. However, the teachings of Avramadis are not suitable for a modern multi-gear bicycle drivetrain application. This is due to the invention of Avramadis will not be able to accommodate 72 degrees of total rotatable link articulation as is needed on modern bicycle chains.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a bicycle chain includes a pair of outer plates and a pair of inner plates. The pair of outer plates defines a width of the bicycle chain in a transverse direction, and the pair of inner plates is positioned at least partially between the pair of outer plates. The bicycle chain also includes a connecting pin assembly connecting the pair of outer plates with the pair of inner plates. In various embodiments, the connecting pin assembly includes a first rocker pin, a second rocker pin, and a center pin between the first rocker pin and the second rocker pin in a longitudinal direction. In some embodiments, a length of the center pin in the transverse direction is less than the width of the bicycle chain.

According to various embodiments, a bicycle chain includes a pair of outer plates, a pair of inner plates, and a connecting pin assembly connecting the pair of outer plates with the pair of inner plates. The pair of outer plates includes outer surfaces and inner surfaces. The outer surfaces are outermost surfaces of the bicycle chain in a transverse direction, and the inner surfaces face each other. The connecting pin assembly includes a first rocker pin, a second rocker pin, and a center pin between the first rocker pin and the second rocker pin in a longitudinal direction. The center pin includes a pair of opposing ends in the transverse direction, and the inner surfaces of the pair of outer plates cover the opposing ends of the center pin and constrain the center pin in the transverse direction.

According to some embodiments, a bicycle chain includes a pair of outer plates that are elongated in a longitudinal direction and include outer surfaces and inner surfaces. The outer surfaces are outermost surfaces of the bicycle chain in a transverse direction, and the inner surfaces face each other. The bicycle chain also includes a pair of inner plates at least partially between the inner surfaces of the pair of outer plates. In certain embodiments, the bicycle chain also includes a connecting pin assembly connecting the pair of outer plates with the pair of inner plates. The connecting pin assembly includes a first rocker pin extending between the pair of outer plates, a second rocker pin extending between the pair of inner plates, and a center pin between the first rocker pin and the second rocker pin in the longitudinal direction. In some embodiments, the first rocker pin is fixedly connected to the pair of outer plates. In various embodiments, the center pin is not fixed to the pair of inner plates and is not fixed to the pair of outer plates.

According to certain embodiments, a bicycle chain includes pair of outer plates having outer surfaces and inner surfaces, where a distance between the outer surfaces is a width of the bicycle chain in a transverse direction. The bicycle chain also includes a pair of inner plates at least partially between the pair of outer plates. The bicycle chain may also include a connecting pin assembly connecting the pair of outer plates with the pair of inner plates. In certain embodiments, the connecting pin assembly includes a first rocker pin having a first engagement face, a second rocker pin having a second engagement face, and a center pin between the first rocker pin and the second rocker pin. In some embodiments, the center pin includes a first center engagement face configured to engage the first engagement face and a second center engagement face configured to engage the second engagement face. In various embodiments, the first engagement face, the second engagement face, the first center engagement face, the second center engagement face each have a convex profile. In certain embodiments, a length of the center pin in the transverse direction is less than the width of the bicycle chain, and the inner surfaces of the pair of outer plates constrain the center pin in the transverse direction.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 9 is a side sectional view of a portion of the bicycle chain of FIG. 1.

FIG. 10A is a side view of an inner link for a bicycle chain according to various embodiments.

FIG. 10B is a sectional view of the inner link of FIG. 10A taken along line 10B-10B in FIG. 10A.

FIG. 11A is a side view of an inner link for a bicycle chain according to various embodiments.

FIG. 11B is a sectional view of the inner link of FIG. 11A taken along line 11B-11B in FIG. 11A.

FIG. 12A is a side view of one of the outer link of the bicycle chain of FIG. 1.

FIG. 12B is a sectional view of the outer link of FIG. 12A taken along line 12B-12B in FIG. 12A.

FIG. 13A is a side view of an outer link for a bicycle chain according to various embodiments.

FIG. 13B is a sectional view of the outer link of FIG. 13A taken along line 13B-13B in FIG. 13A.

FIG. 19A is a side view of a portion of a bicycle chain according to various embodiments.

FIG. 19B is a sectional view of the bicycle chain of FIG. 19A.

DETAILED DESCRIPTION

Figure 1:
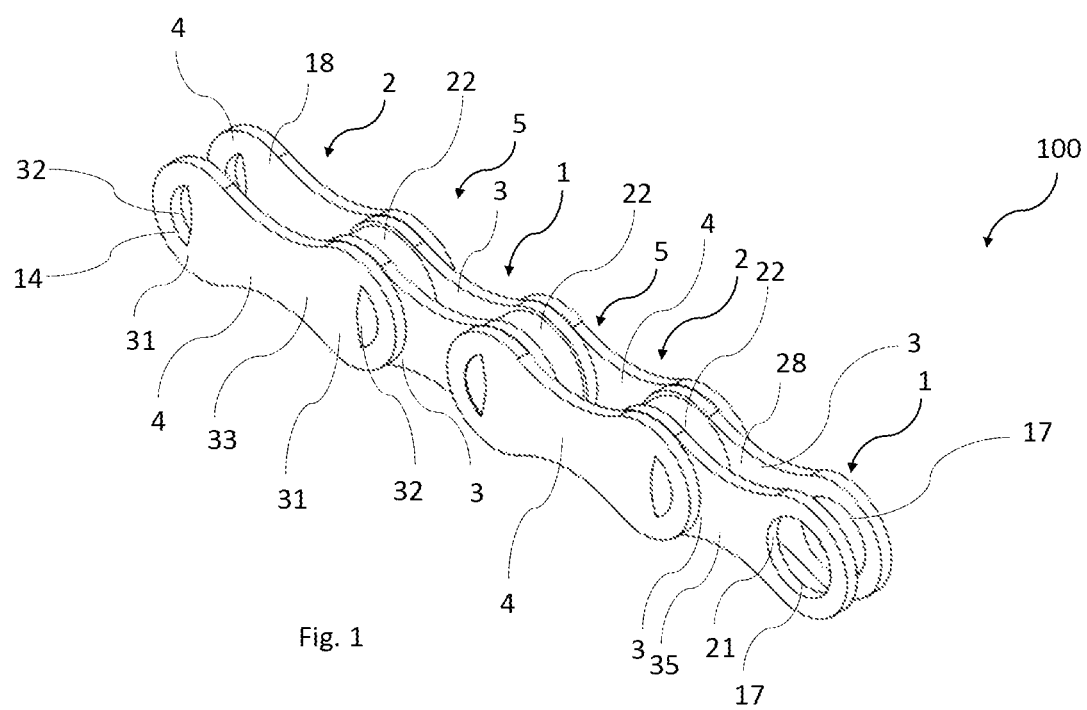
FIG. 1 is a perspective view of a bicycle chain having at least one inner link, at least one outer link, and at least one connecting pin assembly according to various embodiments.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others are intended to refer to the orientation as illustrated and described in the figure (or figures) to which the components and directions are referencing but are not intended to imply any particular configuration.

Described herein is a chain for bicycles that includes a plurality of chain links that are rotatably connected via one or more connecting pin assemblies having a first rocker pin, a second rocker pin, and a center pin. The center pin is between the first rocker pin and the second rocker pin in a longitudinal (e.g., length) direction of the chain and a length of the center pin in a transverse direction is less than a width of the bicycle chain in the transverse direction. The center pin may have independent movement and is not fixed to an adjacent structure. Such a floating center pin may allow for freedom of rotation of said center pin and allows the chain to maintain a narrow profile while minimizing or preventing the center pin from escaping the chain.

In certain aspects, the bicycle chains described herein may have a reduced width in the transverse direction compared to existing chains. Additionally, the bicycle chains described herein may allow for the lateral flex of the chain. As a non-limiting example, the rocker pins may not be firmly affixed to the associated pair of inner plates, and the inner links can pivot (yaw) somewhat in relation to and at the contact point of the rocker pin in response to forced chain skew, thereby allowing an increase in the lateral chain bending ability. Alternative embodiments with alternative design elements between the inner plates and the rocker pins are provided to allow pivoting of the inner plates, ultimately providing for increased chain lateral flex.

FIGS. 1-9 illustrate an embodiment of a bicycle chain 100 that includes one or more inner links 1, one or more outer links 2, and one or more connecting pin assemblies 5. The number of inner links 1, outer links 2, and connecting pin assemblies 5 illustrated in the figures should not be considered limiting, as the bicycle chain 100 may include any desired number of inner links 1, outer links 2, and/or connecting pin assemblies 5 as desired. The outer links 2, inner links 1, and connecting pin assemblies 5 are described in detail below.

Outer Links

Figure 2A:
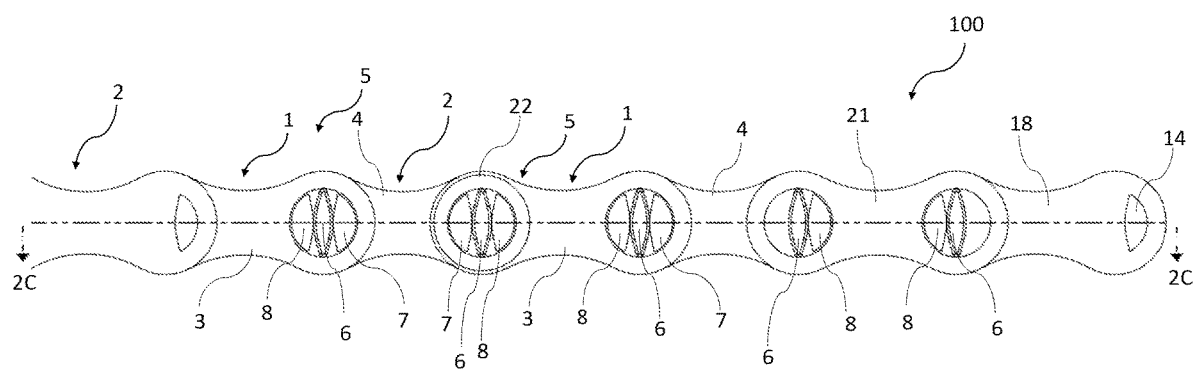
FIG. 2A is a side view of the bicycle chain of FIG. 1 with some of the inner plates and outer plates removed.
Figure 2B:
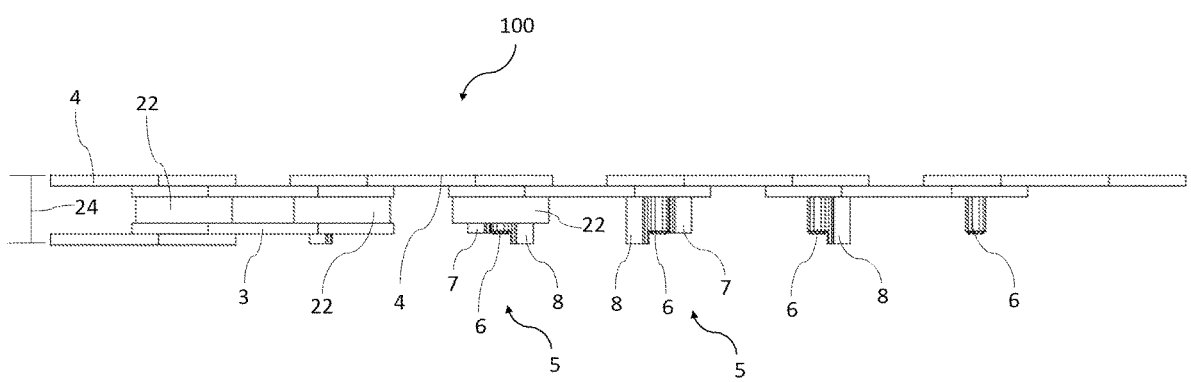
FIG. 2B is a top view of the bicycle chain of FIG. 1 with some of the inner plates and outer plates removed.

Each outer link 2 includes a pair of outer plates 4, and each outer plate has an inner face 18 and an outer face 33. When the outer link 2 is assembled, the inner faces 18 of the pair of outer plates 4 face each other, and the outer faces 33 of the pair of outer plates 4 face in opposing directions. In certain embodiments, the outer faces 33 may be the outermost surfaces of the chain 100 in the transverse direction. In various embodiments, and as illustrated in FIG. 2B, a distance 24 between the outer faces 33 is a width of the chain 100.

In certain embodiments, the outer plates 4 are elongated in a longitudinal direction. The outer plates 4 may have various shapes or profiles as desired and may be any shape that can engage with the sprockets of the bicycle drivetrain. In the embodiment of FIGS. 1-9, the outer plates have a generally oval or dog-bone shape when viewed in the transverse direction.

Figure 17:
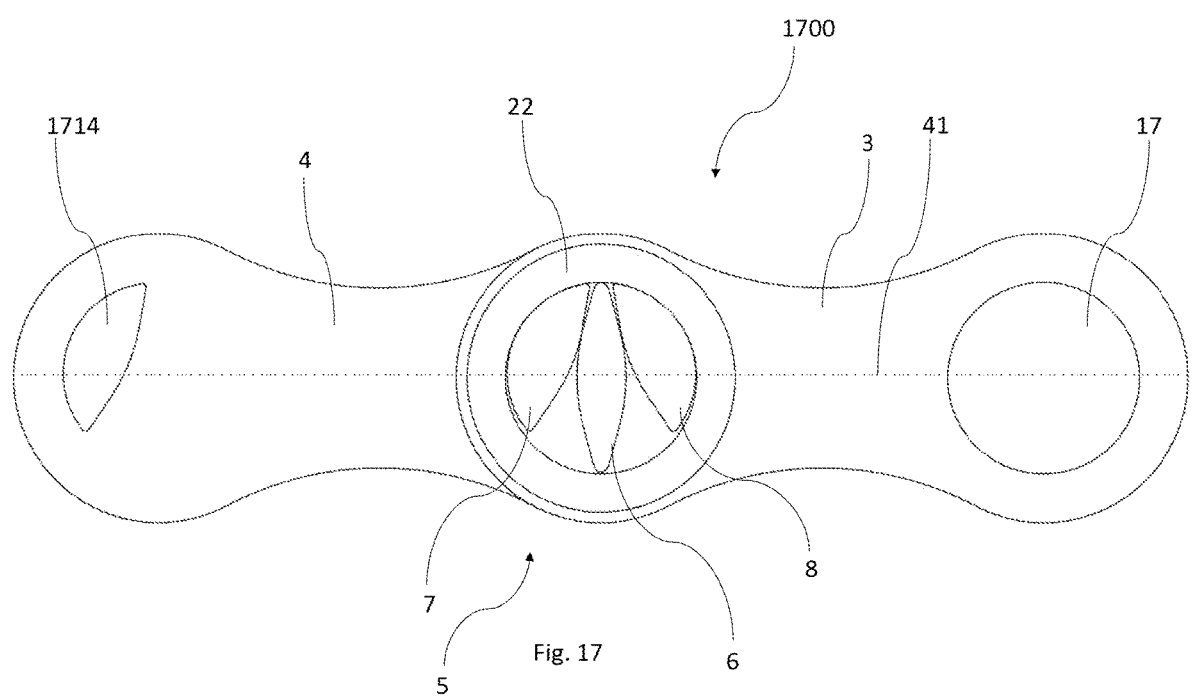
FIG. 17 is a side sectional view of a portion of a bicycle chain according to various embodiments.

Each outer plate 4 has opposing end regions 31, and each end region 31 may include a connecting feature 32. In certain embodiments, the connecting features 32 may be various suitable mechanisms or features for engaging the connecting pin assembly 5 as discussed in detail below. In some non-limiting examples, the connecting features 32 may include outer plate apertures 14. In such embodiments, the outer plate apertures 14 may have various suitable shapes or profiles as desired. As one non-limiting embodiment, FIGS. 1-9 illustrate the outer plate apertures 14 with a third moon shape. As another non-limiting embodiment, FIG. 17 illustrates another example of a bicycle chain 1700 that is substantially similar to the bicycle chain 100 except that outer plate aperture 1714 are third moon shape with a different orientation compared to that of FIGS. 1-9. As a further non-limiting embodiment, FIGS. 19A-B illustrate another embodiment of a bicycle chain 1900 that is substantially similar to the bicycle chain 100 except that outer plate apertures 1914 are a half moon shape. Other moon shaped portions (e.g., ⅔, ⅖, etc) may be utilized as desired in other embodiments, and in further embodiments, the outer plate apertures may be other shapes and do not need to be limited to moon shaped portions.

Inner Links

Each inner link 1 includes a pair of inner plates 3, and each inner plate 3 includes an inner face 28 and an outer face 35. When the inner link 1 is assembled, the inner faces 28 of the pair of inner plates 3 face each other, and the outer faces 35 of the pair of inner plates 3 face in opposing directions. In certain embodiments, the outer faces 35 of the inner plates 3 may face (and optionally contact) corresponding inner faces 18 of the outer plates 4.

In certain embodiments, the inner plates 3 are elongated in the longitudinal direction. In some embodiments, the inner plates 3 may have a shape or profile that is substantially similar to the shape or profile of the outer plates 4, although they need not in other embodiments and may have various shapes or profiles as desired and/or any shape which can engage with the sprockets of the bicycle drivetrain. In the embodiment of FIGS. 1-9, similar to the outer plates 4, the inner plates 3 have a generally oval or dog-bone shape when viewed in the transverse direction.

Figure 5:
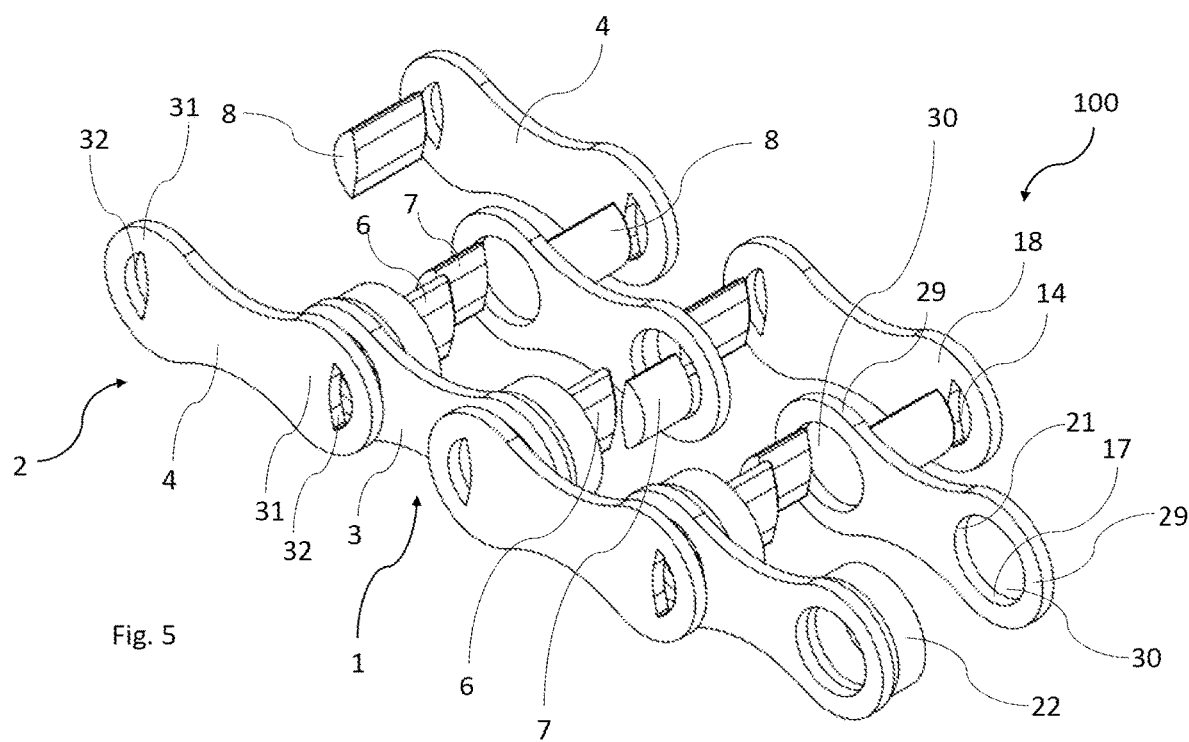
FIG. 5 is an exploded perspective view of a portion of the bicycle chain of FIG. 1.
Figure 21:
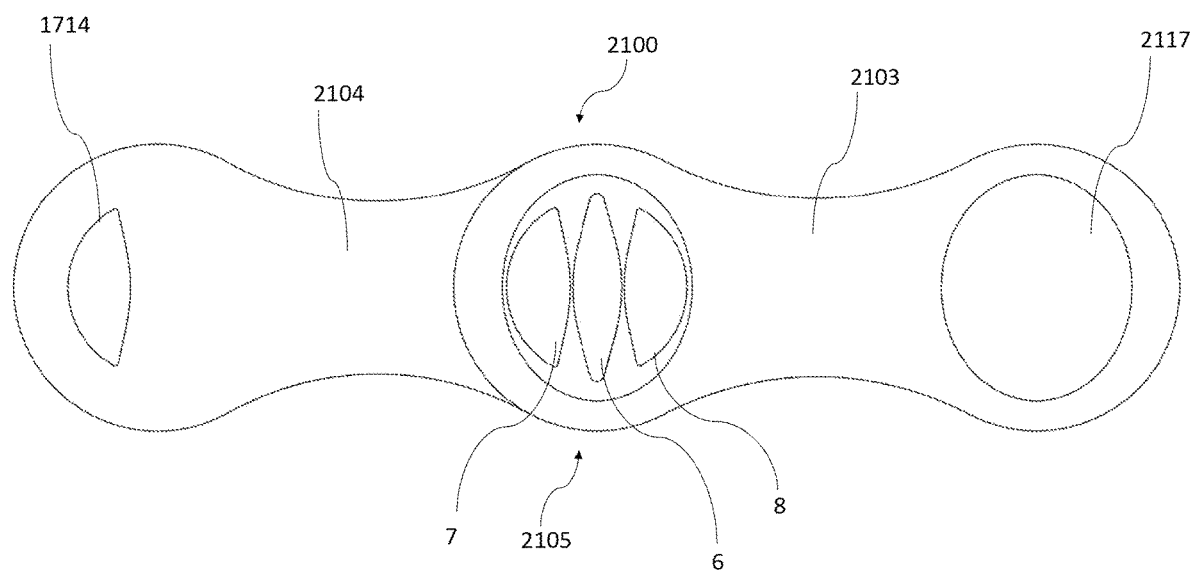
FIG. 21 is a side sectional view of a bicycle chain having at least one inner link, at least one outer link, and at least one connecting pin assembly according to various embodiments.

Similar to the outer plates 4, and as best illustrated in FIG. 5, for example, each inner plate 3 has opposing end regions 29, and each end region 29 may include a connecting feature 30. The connecting features 30 may be various suitable mechanisms or features for engaging the connecting pin assembly 5. In some non-limiting examples, the connecting features 30 may include inner plate apertures 17. In various aspects, each inner plate aperture 17 has an aperture face 21. Optionally, the aperture face 21 may include an indentation defined in the aperture face 21 and/or may include a protrusion that extends into the inner plate aperture 17. In other embodiments, and as illustrated in FIG. 1, for example, the aperture face 21 need not include a protrusion, indentation, or other feature as desired. The inner plate aperture 17 may have various shapes or profiles as desired. As one non-limiting embodiment, in FIGS. 1-7, the inner plate aperture 17 has a generally circular profile. As another non-limiting embodiment, FIG. 21 illustrates the bicycle chain 2100 that is substantially similar to the bicycle chain 100 except that the inner plate apertures 2117 have an oval shape. In various embodiments, at least one aspect of the connecting features 30 may be different from a corresponding aspect of the connecting features 32.

Connecting Pin Assembly

As illustrated in FIGS. 1-9, the connecting pin assembly 5 includes a first rocker pin 8, a second rocker pin 7, and a center pin 6.

Figure 14A:
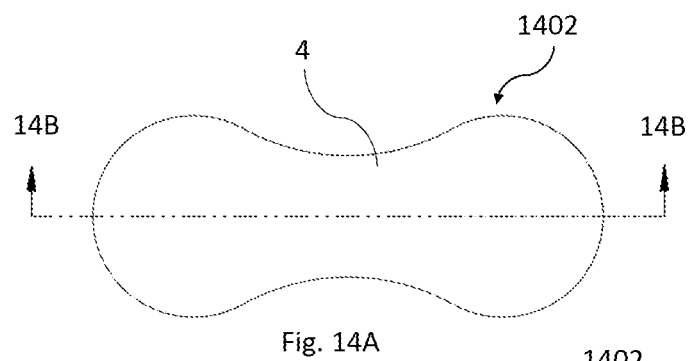
FIG. 14A is a side view of an outer link for a bicycle chain according to various embodiments.
Figure 14B:
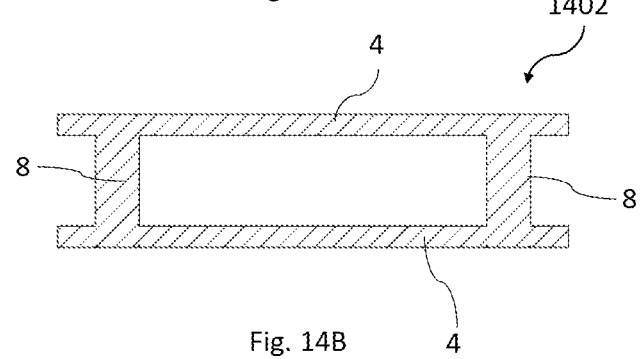
FIG. 14B is a sectional view of the outer link of FIG. 14A taken along line 14B-14B in FIG. 14A.

The first rocker pin 8 is associated with the outer link 2 and extends between the pair of outer plates 4, and in various embodiments, the first rocker pin 8 may extend through the inner plate apertures 17 of the inner link 1. In some cases, a length of the first rocker pin 8 in the transverse direction may be less than or equal to the width of the chain 100. In certain embodiments, the first rocker pin 8 is fixed relative to the outer plates 4. Such attachment may secure the chain links from disassembly. The first rocker pin 8 may also extend through the inner plate apertures 17. In some embodiments, and as illustrated in FIGS. 5, 12A, and 12B, the first rocker pin 8 is a separate component that is firmly secured by press fit or other means into the outer plate apertures 14 of the pair of outer plates 4 to form a rigid connection between the first rocker pin 8 and the pair of outer plates 4. FIGS. 13A-B illustrate another embodiment of an outer link 1302 that is substantially similar to the outer link 2 except that the first rocker pins 8 are monolithically or integrally formed with one of the outer plates 4 (e.g., via forging, casting, additive manufacturing, or other techniques as desired). In this embodiment, the opposing end of the first rocker pins 8 (e.g., the ends opposite from the outer plate 4 with which the first rocker pins 8 are formed) is firmly secured by press fit or other means into the outer plate apertures 14 in the opposing outer plate 4. FIGS. 14A-B illustrate another embodiment of an outer link 1402 that is substantially similar to the outer link 2 except that the first rocker pins 8 are monolithically or integrally formed with both outer plates 4 of the outer link 1402.

Figure 2C:
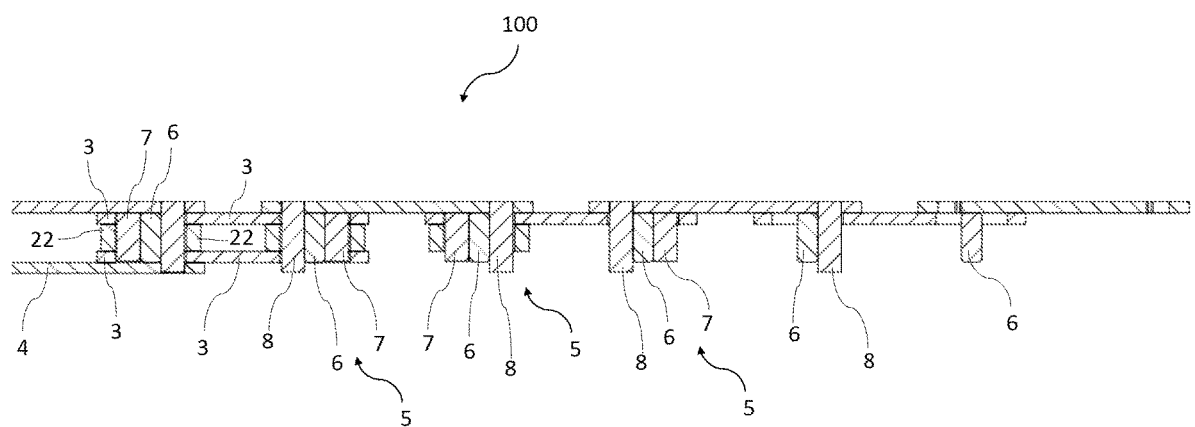
FIG. 2C is a sectional view of the bicycle chain of FIG. 1 taken along line 2C-2C in FIG. 2A.
Figure 3:
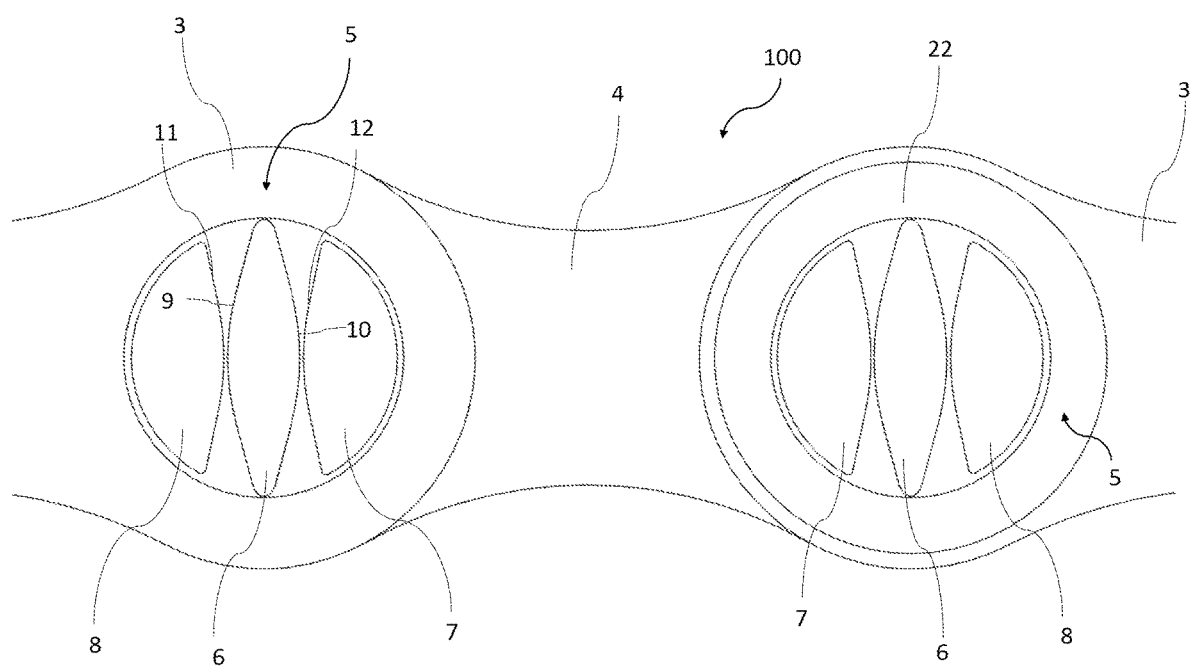
FIG. 3 is a side sectional view of a portion of the bicycle chain of FIG. 1.
Figure 4:
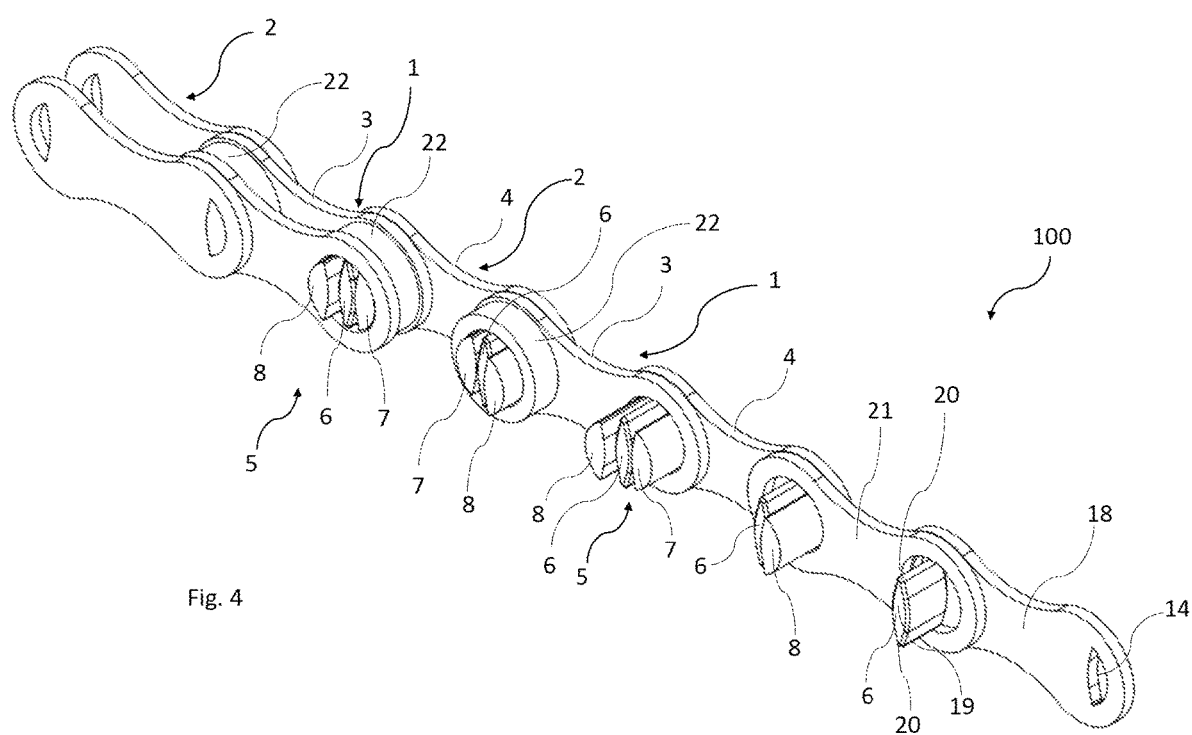
FIG. 4 is a perspective view of the bicycle chain of FIG. 1 with some of the inner plates and outer plates removed.
Figure 18:
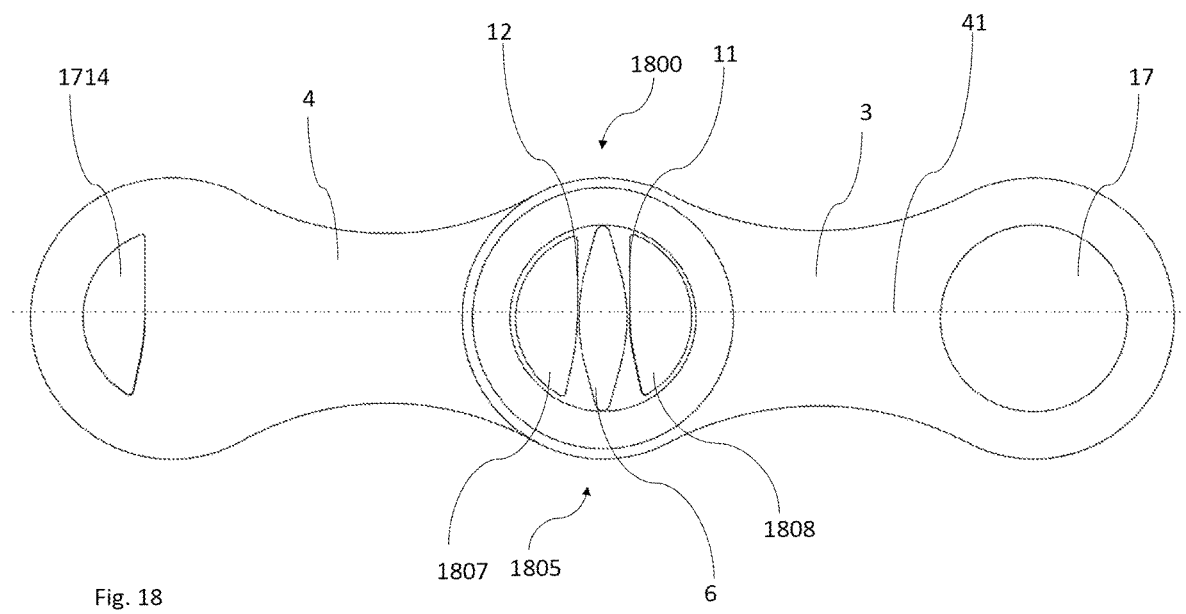
FIG. 18 is another side sectional view of a portion of bicycle chain according to various embodiments.

As illustrated in FIGS. 3 and 9, for example, the first rocker pin 8 includes an engagement face 11 that faces the center pin 6, and at least a portion of the engagement face 11 contacts the center pin 6 at various angles of articulation as discussed in detail below. In some embodiments, the engagement face 11 has a non-linear profile. In the embodiment of FIGS. 1-9, the engagement face 11 has a convex curved profile; however, the engagement face 11 may have other profiles as desired. As one non-limiting embodiment, FIG. 18 illustrates the bicycle chain 1800 that is substantially similar to the bicycle chain 100 except that the curvature of the engagement face 11 of the first rocker pin 1808 of the connecting pin assembly 1805 is reduced in the bicycle chain 1800 compared to the engagement face 11 of the connecting pin assembly 5 of the bicycle chain 100.

In some embodiments, and as best illustrated in FIGS. 19A-B, the engagement face 11 may be non-linear in the transverse direction. In the embodiment in FIGS. 19A-B, the engagement face 11 is arcuate shaped in the transverse direction. In some cases, a non-linear profile in the transverse direction may accommodate lateral flex (skew) in the chain. In other embodiments, the engagement face 11 may be linear and/or have other profiles as desired in the transverse direction.

In some embodiments, and as illustrated in FIG. 3, for example, the first rocker pin 8 has a shape that is symmetrical vertically with respect to the vertical cross section above and below a horizontal plane. In other embodiments, the first rocker pin 8 need not be symmetrical, and a shape of a portion of the first rocker pin 8 below the horizontal plane may be different from a shape of a portion of the first rocker pin 8 above the horizontal plane.

The second rocker pin 7 may be associated with the inner link 1 and extends between the inner plates 3. In certain embodiments, a length of the second rocker pin 7 in the transverse direction is less than the length of the first rocker pin 8 and less than the width of the chain 100. In some embodiments, the inner faces 18 of the outer plates 4 may cover and/or otherwise constrain the second rocker pin 7 in the transverse direction. In some embodiments, and as best illustrated in FIGS. 2C, 11A, and 11B, for example, the second rocker pin 7 is not firmly affixed to the pair of inner plates 3. In some of these embodiments, the second rocker pin 7 may pass through the pair of inner plate apertures 17 and may be loosely constrained in the transverse direction by the inner faces 18 of the pair of outer plates 4. The second rocker pin 7 may be constrained in the longitudinal direction on one side by the aperture face 21 of the pair of inner plates apertures 17 and on the other side by the center pin 6. By not firmly affixing the second rocker pins 7 to the inner plates 3, the chain may have greater lateral flexibility (chain skew).

FIGS. 10A-B illustrate another embodiment of an inner link 1001 that is substantially similar to the inner link 1 except that in the inner link 1001, the second rocker pins 7 are firmly affixed or attached to the inner plates 3 via press fitting or other techniques as desired. In other embodiments, the second rocker pins 7 may be monolithically or integrally formed with one or both of the inner plates 3.

Figure 15:
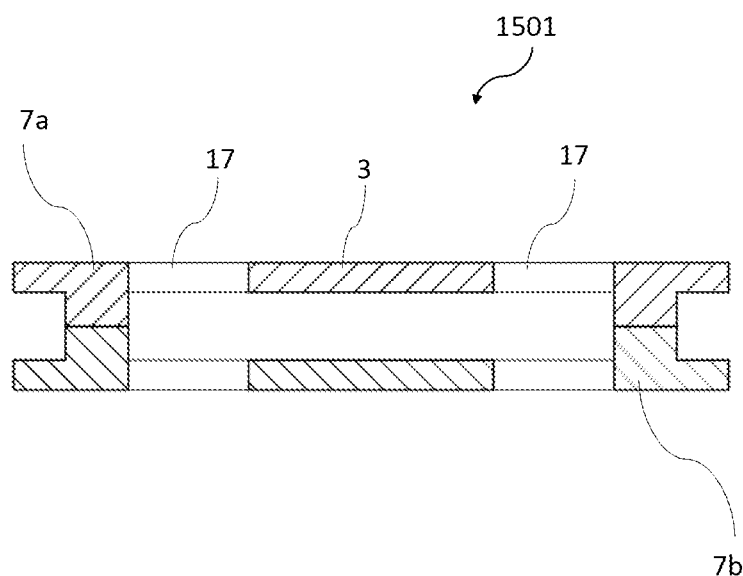
FIG. 15 is a sectional view of an inner link for a bicycle chain according to various embodiments.

FIG. 15 illustrates another embodiment of an inner link 1501 that is substantially similar to the inner link 1001 except that one or both of the second rocker pins 7 are bisected vertically at the transverse midpoint to create two pin sections 7a, 7b. In this embodiment, each resulting pin section 7a, 7b may be firmly affixed to the associated inner plate 3 and/or may be monolithically or integrally formed with the associated inner plate 3. In the embodiment of FIG. 15, a pin section and respective inner plate are a single component, therefore decreasing the total parts count for the chain, yet the vertical bisection of the inner link rocker pin may allow the chain to achieve greater lateral flexibility (chain skew).

Referring back to FIGS. 3 and 9, for example, the second rocker pin 7 includes an engagement face 12 that faces the center pin 6, and at least a portion of the engagement face 12 contacts the center pin 6 at various angles of articulation as discussed in detail below. In certain embodiments, the engagement face 12 contacts the center pin 6 opposite from the engagement face 11. In some embodiments, the engagement face 12 has a non-linear profile. In the embodiment of FIGS. 1-9, the engagement face 12 has a convex curved profile; however, the engagement face 12 may have other profiles as desired. As one non-limiting embodiment, FIG. 18 illustrates another example of a bicycle chain 1800 that is substantially similar to the bicycle chain 100 except that the curvature of the engagement face 12 of the second rocker pin 1807 of the connecting pin assembly 1805 is reduced in the bicycle chain 1800 compared to engagement face 12 of the connecting pin assembly 5 of the bicycle chain 100.

In some embodiments, and as best illustrated in FIGS. 19A-B, the engagement face 12 may be non-linear in the transverse direction. In the embodiment in FIGS. 19A-B, the engagement face 12 is arcuate shaped in the transverse direction. In some cases, a non-linear profile in the transverse direction may accommodate lateral flex (skew) in the chain. In other embodiments, the engagement face 12 may be linear and/or have other profiles as desired in the transverse direction. In some embodiments, and as illustrated in FIG. 3, for example, the second rocker pin 7 has a shape that is symmetrical vertically with respect to the vertical cross section above and below the horizontal plane. In other embodiments, the second rocker pin 7 need not be symmetrical, and a shape of a portion of the second rocker pin 7 below the horizontal plane may be different from a shape of a portion of the second rocker pin 7 above the horizontal plane.

In various embodiments, the center pin 6 may be provided between the first rocker pin 8 and the second rocker pin 7 in the longitudinal direction such that the rocker pins 7, 8 are on both sides of the center pin 6. Such a configuration may optionally minimize sliding at extreme articulation angles and/or may minimize pitch variances at these extreme articulation angles.

Figure 6:
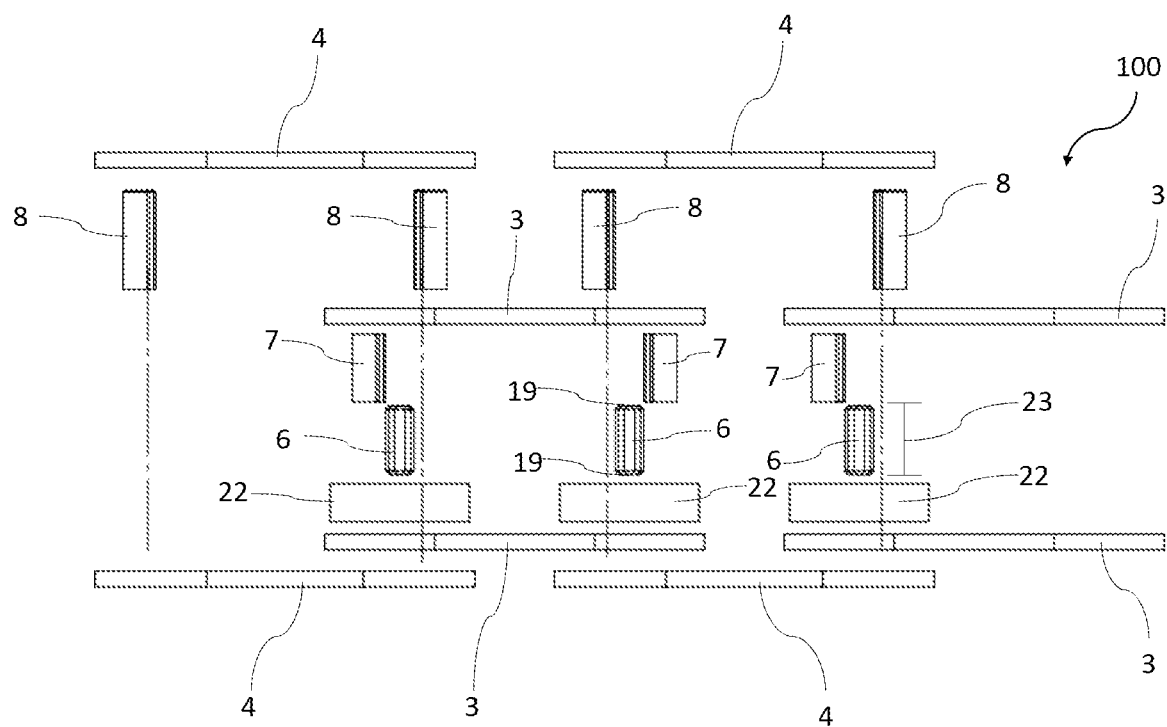
FIG. 6 is an exploded top view of a portion of the bicycle chain of FIG. 1.
Figure 7:
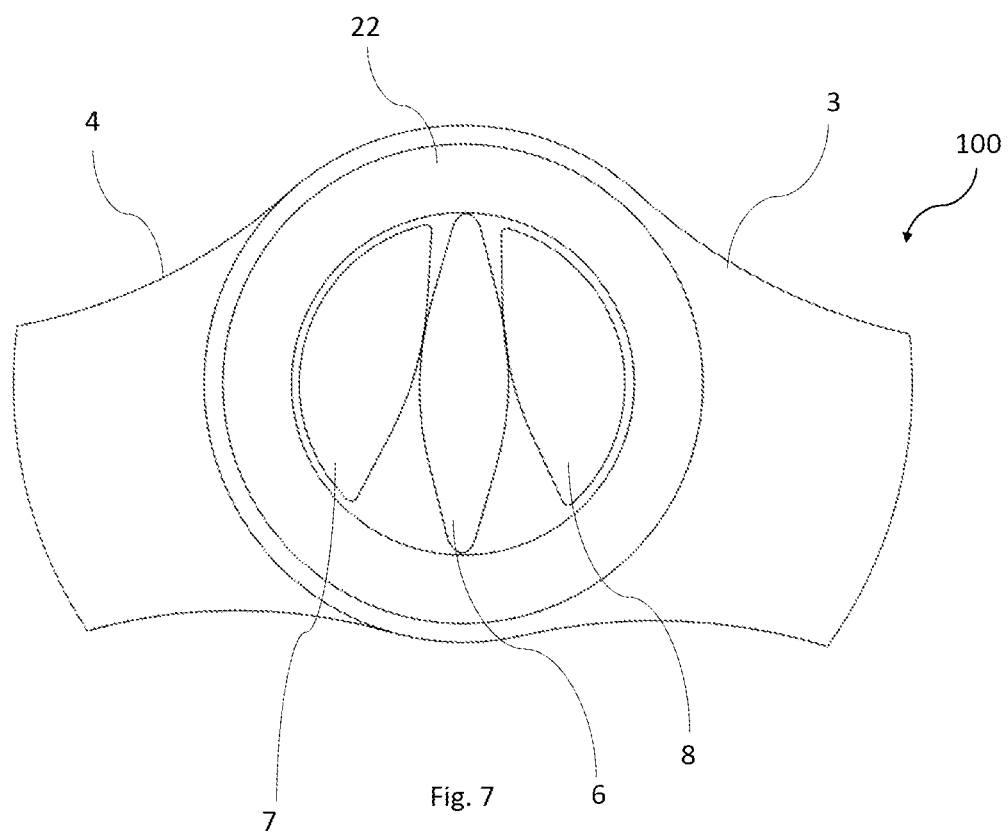
FIG. 7 is a side sectional view of a portion of the bicycle chain of FIG. 1.

The center pin 6 of the connecting pin assembly 5 is not firmly affixed to any adjacent surfaces. In this aspect, the center pin 6 may "float" in that the center pin 6 is not fixed relative to the first rocker pin, the second rocker pin, the inner plates, or the outer plates, and the center pin 6 may instead have independent movement. In various embodiments, the center pin 6 has opposing ends 19 in the transverse direction as best illustrated in FIG. 6, for example. The center pin 6 passes through the inner plate apertures 17, and the inner faces 18 of the pair of outer plates 4 may overlap the ends 19 in the transverse direction and/or otherwise loosely constrain the center pin 6 in the transverse direction. In other words, the outer plates 4 may provide a barrier to restrict substantial transverse movement of the floating center pin 6. The center pin 6 is constrained fore and aft in the longitudinal direction by the first rocker pin 8 on one side and the second rocker pin 7 on the other side. The center pin 6 is constrained vertically by the aperture faces 21 of the pair of inner plate apertures 17. With this arrangement, a length of the center pin 6 is less than the distance between the inner faces 18 of the pair of outer plates 4 and is less than the distance 24 between the outer faces 33 of the pair of outer plates 4. In addition, the outer plates 4 and the center pin 6 are not firmly attached to each other in any manner, and some amount of minimal clearance may be provided between the center pin 6 and outer plates 4, meaning that there is a small gap between the referenced parts. Such clearance may optionally allow for the center pin 6 to freely rotate as needed when acted upon by the rocking tendency of one or both rocker pins 7, 8, and may optionally allow the chain to bend laterally in the transverse direction.

Figure 20:
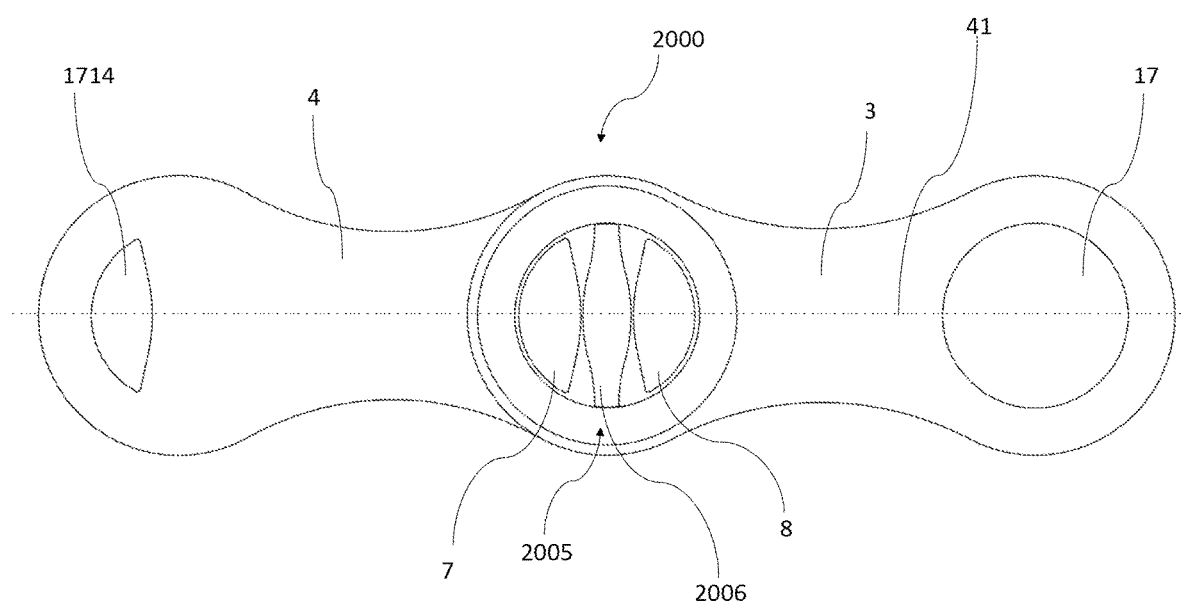
FIG. 20 is a side sectional view of a bicycle chain having at least one inner link, at least one outer link, and at least one connecting pin assembly according to various embodiments.

The center pin 6 may have various shapes or profiles as desired. As one non-limiting embodiment, in FIGS. 1-9, the center pin 6 is in the general shape of an ellipse and/or in the shape of a diamond in vertical cross section. As another non-limiting embodiment, in FIG. 20, the connecting pin assembly 2005 includes the center pin 2006 that is substantially similar to the center pin 6 except that vertical ends of the center pin 6 are flared or otherwise have an increased width in the longitudinal direction compared to the center pin 6 of the bicycle chain 100. In one embodiment, the thickness of the center pin in the longitudinal direction is ¼ the vertical height of the center pin, although it need not be in other embodiments. In some embodiments, and as illustrated in FIG. 3, for example, the center pin 6 has a shape that is symmetrical vertically with respect to the vertical cross section above and below the horizontal plane. In other embodiments, the center pin 6 need not be symmetrical, and a shape of a portion of the center pin 6 below the horizontal plane may be different from a shape of a portion of the center pin 6 above the horizontal plane.

In certain embodiments, and as illustrated in FIGS. 3 and 9, for example, the center pin 6 includes a first center engagement face 9 and a second center engagement face 10. In some embodiments, the center engagement faces 9, 10 have a non-linear shape or profile. A radius of curvature of the center engagement faces 9, 10 (and optionally 11, 12) may optionally be a function of the height of the center pin 6. In some embodiments, engagement surfaces arc radii are a constant radius across the height of the engagement surface. In other embodiments, one or more engagement surfaces have a variable radii arcuate curve across the height of the surface. In various embodiments, the engagement surfaces are pure arcs, which in other embodiments, the engagement surfaces could also be segmented in a polygonal manner representing an arc, instead of a true curved arc.

In the embodiments of FIGS. 1-9, the engagement faces 9, 10 have a convex curved shape. When assembled with the rocker pins 7, 8, a portion of the first center engagement face 9 may selectively contact a portion of the engagement face 11, and a portion of the second center engagement face 10 may selectively contact a portion of the engagement face 12. In some embodiments, the arc radii of the engagement faces 9, 10, 11, 12 are substantially similar. In other embodiments (and optionally depending on profile or shape), the arc radii of one or more engagement surfaces may be different arc radii to one another.

In certain embodiments, the center engagement faces 9, 10 may define and/or maintain an area of contact with the engagement faces 11, 12 through a full articulation angle θ between alternating inner links 1 and alternating outer links 2. Similarly, the engagement faces 9, 10 may maintain an area of contact with the engagement faces 11, 12 through a full range of articulation between the pair of inner plates 3 and the pair of outer plates 4.

With reference to FIG. 9, the articulation angle between the link plates 3, 4 is given as θ, and the articulation angle θ can be achieved for link plates 3, 4 if the rolling contact with θ/2 is seen at each rocker pin 7, 8. This is due to the effect of the center pin 6 located between both rocker pins 7, 8. In particular, for the bicycle chains described herein, the rolling contact angle θ of each rocker pin 7, 8 allows for twice the articulation angle of a traditional rocker-joint chain with no center pin. With this, higher articulation angles can be produced while maintaining larger radii rocker pin surface arcs, and larger radii rocker pin surfaces produce less sliding (and therefore lower wear and frictional losses) at the higher articulation angles. In some embodiments, the articulation angle θ is from −40° to +40° relative to the horizontal axis (e.g., 80° total articulation), such as from −36° and +36°. In other embodiments, the articulation angle θ may be various other angles as desired.

In some embodiments, and as best illustrated in FIGS. 19A-B, the engagement faces 9, 10 may be linear in the transverse direction. In other embodiments, the engagement faces 9, 10 may be non-linear and/or have other profiles as desired in the transverse direction. Moreover, a profile of the engagement face 9 need not be the same as the profile of the engagement face 10 in any direction.

Optionally, a roller 22 may be loosely received on the connecting pin assembly 5 and loosely constrained in the transverse direction by the inner faces 28 of the pair of inner plates 3. In other words, the roller 22 may encompass a portion of the first rocker pin 8, a portion of the second rocker pin 7, and a portion of the center pin 6, and a diameter of the roller may optionally match a diameter of the connecting pin assembly 5. The roller 22 may be utilized to allow the chain to be compatible with standard tooth profiles of modern bike sprockets. In some embodiments, an inner diameter shape of the roller 22 (e.g., that defines a central aperture of the roller 22) is perfectly circular, although in other embodiments the inner diameter of the roller 22 may have other suitable shapes as desired. In one non-limiting embodiment, the inner diameter of the roller 22 may be oval. Optionally, similar to the inner plate aperture 17, the inner diameter of the roller 22 optionally includes one or more indents or protrusions as desired. In other embodiments, the roller 22 may be omitted.

Assembled Chain

The bicycle chain 100 is assembled by providing the inner links 1 and the outer links 2 in an alternating arrangement. In certain embodiments, a portion of one of the inner links 1 may be at least partially received between the pair of outer plates 4 of an adjacent outer link 2. In some embodiments, adjacent inner links 1 and outer links 2 are assembled such that the end regions 29, 31 at least partially overlap. Optionally, adjacent inner links 1 and outer links 2 are assembled such that the connecting features 30, 32 are aligned in the transverse direction. In some embodiments, some level of clearance exists between the inner and outer plates to accommodate chain skew. However, in other embodiments, the clearance between the plates may be just enough to allow free rotation of the joints.

The alternately arranged inner links 1 and outer links 2 are rotatably connected to one another via the connecting pin assembly 5, and in certain embodiments, the end regions 29, 31 of adjacent inner plates 3 and outer plates 4 may be connected by the connecting pin assembly 5 extending in a transverse direction. When the inner link 1, the outer link 2, and the connecting pin assembly 5 are assembled, the first rocker pin 8 connects the pair of outer plates 4 and extends through the inner plate apertures 17 (and optionally through the central aperture of the roller 22). In certain aspects, the first rocker pin 8 is fixedly connected to the pair of outer plates 4. The second rocker pin 7 extends between the pair of inner plates 3. In some embodiments, the second rocker pin 7 is positioned in the inner plate apertures 17, and the second rocker pin 7 may be fixedly attached to the inner plates 3 or loosely constrained and/or movable relative to the inner plates 3. In certain embodiments, inner faces 18 of the outer plates 4 overlap and/or constrain the second rocker pin 7 in the transverse direction. In various embodiments, the length of the second rocker pin 7 in the transverse direction is less than the length of the first rocker pin 8 and less than the width of the chain 100. The center pin 6 is between the first rocker pin 8 and the second rocker pin 7 in the longitudinal direction and extends into the inner plate apertures 17 in the transverse direction. In various aspects, the center pin 6 is not fixed to an adjacent structure (e.g., the outer plates 4, the inner plates 3, etc.) and is independently movable. The center pin 6 may be constrained in the longitudinal direction by the rocker pins 7, 8, may be constrained in the vertical direction by the inner plate apertures 17, and may be loosely constrained in the transverse direction by the outer plates 4. In certain embodiments, the inner faces 18 of the outer plates 4 overlap and/or constrain the center pin 6 in the transverse direction. A length of the center pin 6 in the transverse direction is less than the length of the first rocker pin 8 and less than the width of the chain 100.

Figure 8:
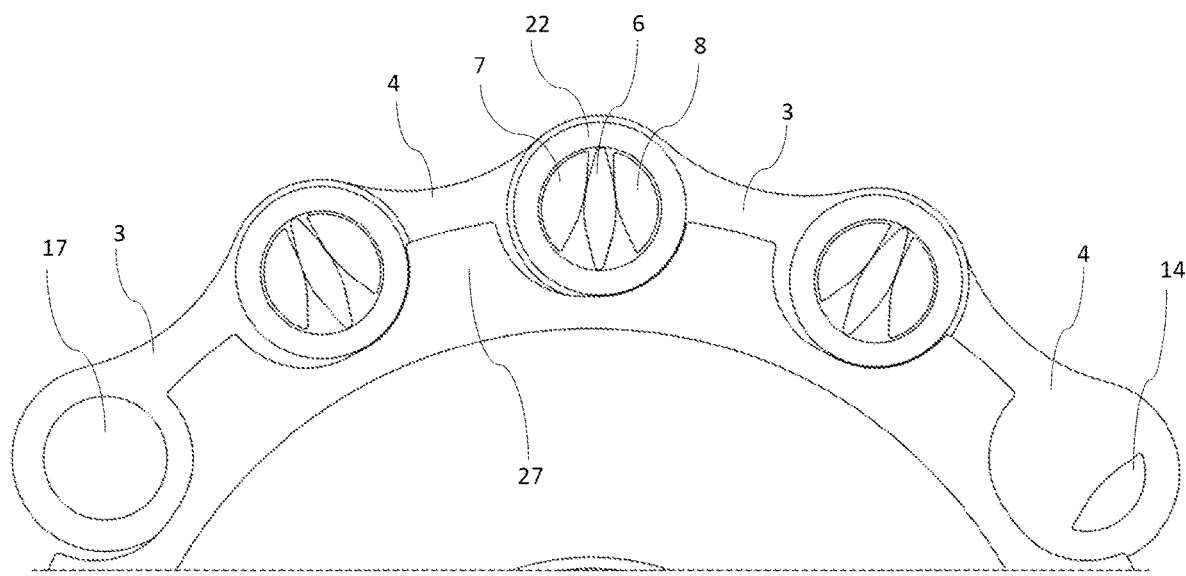
FIG. 8 is a side sectional view of the bicycle chain of FIG. 1 on a sprocket according to various embodiments.
Figure 16:
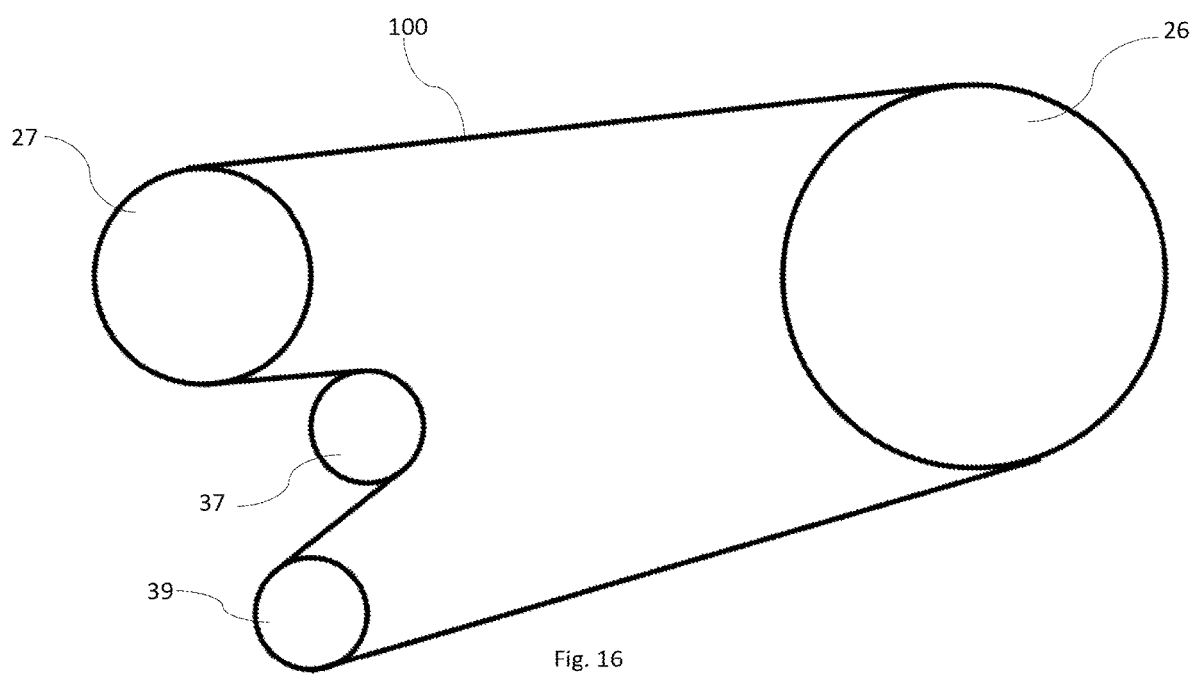
FIG. 16 illustrates the bicycle chain of FIG. 1 on sprockets and pulley wheels according to various embodiments.

Referring to FIG. 16, in certain embodiments, when the bicycle chain 100 is provided on a bicycle, the chain 100 optionally connects a front sprocket 26, a rear sprocket 27, and pulley wheels 37, 39. In this embodiment, when the chain 100 is in a straightened manner under tension and transferring power from the front sprocket 26 to the rear sprocket 27, the rocker pins 7, 8 and the center pin 6 forming the connecting pin assembly 5 are in a compressive force situation acting upon each other in a linear manner. An alternating chain link (e.g., inner link 1 or outer link 2) engages the front sprocket 26, and the sprocket 26 causes the alternating chain links 1, 2 to articulate at some angular amount θ relative to each other. FIG. 8 illustrates other embodiments of angular positions of the alternating inner plates 3 and outer plates 4 and pins 6, 7, 8 relative to each other and during an articulation event.

During an articulation event, the second rocker pin 7 and the first rocker pin 8 roll an angular amount equal to θ relative to each other. The center pin 6 rolls an amount approximately half of θ relative to each adjacent rocker pin 7, 8. The three pins 6, 7, 8 contact each other at their associated engagement faces 9, 10, 11, 12 during the articulation event. Specifically, engagement face 11 contacts and rolls against the opposing first center engagement face 9, and the engagement face 12 contacts and rolls against the opposing center engagement face 10.

In certain embodiments, the first rocker pin 8, the second rocker pin 7, and the center pin 6 each have vertical center point. In some cases, the vertical center points of rotation of the pins 6, 7, 8 are aligned and coplanar in the longitudinal direction when the chain is in a straightened (not articulated) manner. As a non-limiting embodiment, in FIG. 3, when the chain 100 and the chain links 1, 2 are in a straightened condition (i.e., the links 1, 2 are not articulated), the center points of the rocker pins are aligned in the longitudinal direction. In other embodiments, at least vertical center point need not be aligned in the longitudinal direction with another vertical center point. As a non-limiting embodiment, in FIG. 17, when the chain 1700 and chain links are in a straightened manner the center points of the pins 6, 7, 8 are not aligned. In particular, in this embodiment in FIG. 17, one or both of the rocker pins 7, 8 are angularly offset above a center line 41 defined by the center pin 6 extending in the longitudinal direction. In other embodiments, the vertical center points may be offset as otherwise desired.

Optionally, the bicycle chain described herein may include an overdrive slide feature when the second rocker pin 7 and the inner plates 3 are decoupled. In other words, the overdrive slide feature may be provided when the second rocker pin 7 is not fixed to the inner plates 3 (and when the inner plates 3 are likewise not fixed to the first rocker pin 8 or the center pin 6). In such embodiments, the inner plate 3 will still force the second rocker pin 7 to rock until the angular rocking limit is achieved. Once the angular rocking limit is achieved, then the sliding "overdrive" allows the inner plates 3 to continue articulating.

Illustrations

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A bicycle chain comprising: a pair of outer plates, wherein the pair of outer plates defines a width of the bicycle chain in a transverse direction; a pair of inner plates positioned at least partially between the pair of outer plates; and a connecting pin assembly connecting the pair of outer plates with the pair of inner plates, wherein the connecting pin assembly comprises: a first rocker pin; a second rocker pin; and a center pin between the first rocker pin and the second rocker pin in a longitudinal direction, wherein a length of the center pin in the transverse direction is less than the width of the bicycle chain.

Illustration 2. The bicycle chain of any preceding or subsequent illustrations or combination of illustrations, wherein: the first rocker pin comprises a first engagement face; the second rocker pin comprises a second engagement face; the center pin comprises a first center engagement face configured to engage the first engagement face of the first rocker pin and a second center engagement face configured to engage the second engagement face of the second rocker pin; and the first engagement face, the second engagement face, the first center engagement face, and the second center engagement face each comprise a non-linear profile.

Illustration 3. The bicycle chain of any preceding or subsequent illustrations or combination of illustrations, wherein the first engagement face, the second engagement face, the first center engagement face, and the second center engagement face each comprise a convex profile.

Illustration 4. The bicycle chain of any preceding or subsequent illustrations or combination of illustrations, wherein the non-linear profile of the first engagement face is different from the non-linear profile of at least one of the second engagement face, the first center engagement face, or the second center engagement face.

Illustration 5. The bicycle chain of any preceding or subsequent illustrations or combination of illustrations, wherein an angle of articulation of the pair of outer plates relative to the pair of inner plates is −40° to +40° from a horizontal axis.

Illustration 6. The bicycle chain of any preceding or subsequent illustrations or combination of illustrations, wherein the first rocker pin extends between the pair of outer plates and is fixedly connected to the pair of outer plates, wherein the second rocker pin extends between the pair of inner plates, and wherein a length of the second rocker pin in the transverse direction is less than the width of the bicycle chain.

Illustration 7. The bicycle chain of any preceding or subsequent illustrations or combination of illustrations, wherein the second rocker pin is fixedly connected to the pair of inner plates.

Illustration 8. The bicycle chain of any preceding or subsequent illustrations or combination of illustrations, wherein the pair of outer plates constrain the center pin in the transverse direction.

Illustration 9. The bicycle chain of any preceding or subsequent illustrations or combination of illustrations, wherein the connecting pin assembly further comprises a roller encompassing at least a portion of the first rocker pin, at least a portion of the second rocker pin, and at least a portion of the center pin.

Illustration 10. A bicycle chain comprising: a pair of outer plates, wherein the pair of outer plates comprises outer surfaces and inner surfaces, wherein the outer surfaces are outermost surfaces of the bicycle chain in a transverse direction, and wherein the inner surfaces face each other; a pair of inner plates; and a connecting pin assembly connecting the pair of outer plates with the pair of inner plates wherein the connecting pin assembly comprises: a first rocker pin; a second rocker pin; and a center pin between the first rocker pin and the second rocker pin in a longitudinal direction and comprising a pair of opposing ends, wherein the inner surfaces of the pair of outer plates cover the opposing ends of the center pin and constrain the center pin in the transverse direction.

Illustration 11. The bicycle chain of any preceding or subsequent illustrations or combination of illustrations, wherein a length of the center pin in the transverse direction is less than a distance between the outer surfaces of the outer plates.

Illustration 12. The bicycle chain of any preceding or subsequent illustrations or combination of illustrations, wherein the first rocker pin extends between the pair of outer plates and is fixedly connected to the pair of outer plates, wherein the second rocker pin extends between the pair of inner plates, and wherein a length of the second rocker pin in the transverse direction is less than the width of the bicycle chain.

Illustration 13. The bicycle of any preceding or subsequent illustrations or combination of illustrations, wherein the second rocker pin is fixedly connected to the pair of inner plates.

Illustration 14. The bicycle chain of any preceding or subsequent illustrations or combination of illustrations, wherein: the first rocker pin comprises a first engagement face; the second rocker pin comprises a second engagement face; the center pin comprises a first center engagement face configured to engage the first engagement face of the first rocker pin and a second center engagement face configured to engage the second engagement face of the second rocker pin; and the first engagement face, the second engagement face, the first center engagement face, and the second center engagement face each comprise a non-linear profile.

Illustration 15. A bicycle chain comprising: a pair of outer plates elongated in a longitudinal direction, wherein the pair of outer plates comprises outer surfaces and inner surfaces, wherein the outer surfaces are outermost surfaces of the bicycle chain in a transverse direction, and wherein the inner surfaces face each other; a pair of inner plates at least partially between the inner surfaces of the pair of outer plates; and a connecting pin assembly connecting the pair of outer plates with the pair of inner plates, wherein the connecting pin assembly comprises: a first rocker pin extending between the pair of outer plates, wherein the first rocker pin is fixedly connected to the pair of outer plates; a second rocker pin extending between the pair of inner plates; and a center pin between the first rocker pin and the second rocker pin in the longitudinal direction, wherein the center pin is not fixed to the pair of inner plates and is not fixed to the pair of outer plates.

Illustration 16. The bicycle chain of any preceding or subsequent illustrations or combination of illustrations, wherein a length of the center pin in the transverse direction is less than a length of the first rocker pin in the transverse direction.

Illustration 17. The bicycle chain of any preceding or subsequent illustrations or combination of illustrations, wherein a length of the center pin in the transverse direction is less than a distance between the outer surfaces of the pair of outer plates.

Illustration 18. The bicycle chain of any preceding or subsequent illustrations or combination of illustrations, wherein: the first rocker pin comprises a first engagement face; the second rocker pin comprises a second engagement face; the center pin comprises a first center engagement face configured to engage the first engagement face of the first rocker pin and a second center engagement face configured to engage the second engagement face of the second rocker pin; and the first engagement face, the second engagement face, the first center engagement face, and the second center engagement face each comprise a non-linear profile.

Illustration 19. The bicycle chain of any preceding or subsequent illustrations or combination of illustrations, wherein the second rocker pin is not fixed to the pair of inner plates and is not fixed to the pair of outer plates.

Illustration 20. The bicycle chain of any preceding or subsequent illustrations or combination of illustrations, wherein the inner surfaces of the pair of outer plates cover opposing ends of the center pin in the transverse direction and constrain the center pin in the transverse direction.

Illustration 21. A bicycle chain comprising: a pair of outer plates comprising outer surfaces and inner surfaces, and wherein a distance between the outer surfaces is a width of the bicycle chain in a transverse direction; a pair of inner plates at least partially between the pair of outer line plates; and a connecting pin assembly connecting the pair of outer plates with the pair of inner plates, wherein the connecting pin assembly comprises: a first rocker pin comprising a first engagement face; a second rocker pin comprising a second engagement face; and a center pin between the first rocker pin and the second rocker pin, wherein the center pin comprises a first center engagement face configured to engage the first engagement face and a second center engagement face configured to engage the second engagement face, wherein the first engagement face, the second engagement face, the first center engagement face, the second center engagement face each comprise a convex profile, wherein a length of the center pin in the transverse direction is less than the width of the bicycle chain, and wherein the inner surfaces of the pair of outer link inner plates constrain the center pin in the transverse direction.

Illustration 22. The bicycle chain of any preceding or subsequent illustrations or combination of illustrations, wherein the center pin comprises an elliptical cross-sectional profile.

Illustration 23. The bicycle chain of any preceding or subsequent illustrations or combination of illustrations, wherein the connecting pin assembly further comprises a roller encompassing at least a portion of the first rocker pin, at least a portion of the second rocker pin, and at least a portion of the center pin.

Illustration 24. The bicycle chain of any preceding or subsequent illustrations or combination of illustrations, wherein the roller comprises a central aperture, and wherein the first rocker pin, the second rocker pin, and the center pin are received within the central aperture.

Illustration 25. The bicycle chain of any preceding or subsequent illustrations or combination of illustrations, wherein the central aperture comprises at least one of a circular cross-sectional shape or an oval cross-sectional shape.

Illustration 26. The bicycle chain of any preceding or subsequent illustrations or combination of illustrations, wherein a surface of the central aperture comprises at least one of an indentation or a protrusion extending into the central aperture.

Illustration 27. The bicycle chain of any preceding or subsequent illustrations or combination of illustrations, wherein the second rocker pins are monolithically formed.

Illustration 28. The bicycle chain of any preceding or subsequent illustrations or combination of illustrations, wherein the second rocker pins are bisected such that the second rocker pins comprises a first pin portion and second pin portion.

Illustration 29. The bicycle chain of any preceding or subsequent illustrations or combination of illustrations, wherein an angle of articulation of the pair of outer plates relative to the pair of inner plates is −40° to +40° from a horizontal axis extending in a longitudinal direction.

Illustration 30. The bicycle chain of any preceding or subsequent illustrations or combination of illustrations, wherein a length of the second rocker pin in the transverse direction is less than the width of the bicycle chain.

Illustration 31. The bicycle chain of any preceding or subsequent illustrations or combination of illustrations, wherein the inner surfaces of the pair of outer plates constrain the second rocker pin in the transverse direction.

Illustration 32. The bicycle chain of any preceding or subsequent illustrations or combination of illustrations, wherein the first center engagement face is engaged with the first engagement face over a full range of articulation angles of the pair of outer plates relative to the pair of inner plates, and wherein the second center engagement face is engaged with the second engagement face over the full range of articulation angles of the pair of outer plates relative to the pair of inner plates.

Illustration 33. The bicycle chain of any preceding or subsequent illustrations or combination of illustrations, wherein the first engagement face comprises an arc radius, wherein the second engagement face comprises an arc radius, wherein the first center engagement face comprises an arc radius, and wherein the second center engagement face comprises an arc radius.

Illustration 34. The bicycle chain of any preceding or subsequent illustrations or combination of illustrations, wherein the arc radii are the same.

Illustration 35. The bicycle chain of any preceding or subsequent illustrations or combination of illustrations, wherein at least one arc radius is different from another arc radius.

Illustration 36. The bicycle chain of any preceding or subsequent illustrations or combination of illustrations, wherein a clearance is defined between the pair of outer plates and the pair of inner plates.

Illustration 37. The bicycle chain of any preceding or subsequent illustrations or combination of illustrations, wherein at least one inner plate of the pair of inner plates comprises an inner link aperture, and wherein the first rocker pin, the second rocker pin, and the center pin are received within the inner link aperture.

Illustration 38. The bicycle chain of any preceding or subsequent illustrations or combination of illustrations, wherein the inner link aperture comprises a circular cross-sectional shape or an oval cross-sectional shape.

Illustration 39. The bicycle chain of any preceding or subsequent illustrations or combination of illustrations, wherein a surface of the inner link aperture comprises at least one of an indentation or a protrusion extending into the inner link aperture.

Illustration 40. The bicycle chain of any preceding or subsequent illustrations or combination of illustrations, wherein the center pin, the first rocker pin, and second rocker pin each comprise a central axis extending in the transverse direction, and wherein, when the chain is in a straightened configuration, the central axes are parallel.

Illustration 41. The bicycle chain of any preceding or subsequent illustrations or combination of illustrations, wherein the center pin, the first rocker pin, and the second rocker pin each comprise a central axis extending in the transverse direction, and wherein, when the chain is in a straightened configuration, at least one central axis is not parallel to another central axis.

Illustration 42. The bicycle chain of any preceding or subsequent illustrations or combination of illustrations, wherein the second rocker pin is not fixed to the pair of inner plates.

Illustration 43. The bicycle chain of any preceding or subsequent illustrations or combination of illustrations, wherein the second rocker pin is fixed to the pair of inner plates.

Illustration 44. The bicycle chain of any preceding or subsequent illustrations or combination of illustrations, wherein the first rocker pin is fixed to the pair of outer plates and is not fixed to the pair of inner plates.

Illustration 45. The bicycle chain of any preceding or subsequent illustrations or combination of illustrations, further comprising a plurality of pairs of outer plates, a plurality of pairs of inner plates, and a plurality of connecting pin assemblies, wherein each connecting pin assembly connects adjacent pairs of inner plates and outer plates.

The above-described aspects are merely possible examples of implementations, merely set forth for a clear understanding of the principles of the present disclosure. Many variations and modifications can be made to the above-described example(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed is:

1. A bicycle chain comprising:
   a pair of outer plates, wherein the pair of outer plates defines a width of the bicycle chain in a transverse direction;
   a pair of inner plates positioned at least partially between the pair of outer plates; and
   a connecting pin assembly connecting the pair of outer plates with the pair of inner plates, wherein the connecting pin assembly comprises:
      a first rocker pin;
      a second rocker pin; and
      a center pin between the first rocker pin and the second rocker pin in a longitudinal direction, wherein a length of the center pin in the transverse direction is less than the width of the bicycle chain.

2. The bicycle chain of claim 1, wherein:
   the first rocker pin comprises a first engagement face;
   the second rocker pin comprises a second engagement face;
   the center pin comprises a first center engagement face configured to engage the first engagement face of the first rocker pin and a second center engagement face configured to engage the second engagement face of the second rocker pin; and
   the first engagement face, the second engagement face, the first center engagement face, and the second center engagement face each comprise a non-linear profile.

3. The bicycle chain of claim 2, wherein the first engagement face, the second engagement face, the first center engagement face, and the second center engagement face each comprise a convex profile.

4. The bicycle chain of claim 2, wherein the non-linear profile of the first engagement face is different from the non-linear profile of at least one of the second engagement face, the first center engagement face, or the second center engagement face.

5. The bicycle chain of claim 1, wherein an angle of articulation of the pair of outer plates relative to the pair of inner plates is −40° to +40° from a horizontal axis.

6. The bicycle chain of claim 1, wherein the first rocker pin extends between the pair of outer plates and is fixedly connected to the pair of outer plates, wherein the second rocker pin extends between the pair of inner plates, and wherein a length of the second rocker pin in the transverse direction is less than the width of the bicycle chain.

7. The bicycle chain of claim 6, wherein the second rocker pin is fixedly connected to the pair of inner plates.

8. The bicycle chain of claim 1, wherein the pair of outer plates constrain the center pin in the transverse direction.

9. The bicycle chain of claim 1, wherein the connecting pin assembly further comprises a roller encompassing at least a portion of the first rocker pin, at least a portion of the second rocker pin, and at least a portion of the center pin.

10. A bicycle chain comprising:
    a pair of outer plates, wherein the pair of outer plates comprises outer surfaces and inner surfaces, wherein the outer surfaces are outermost surfaces of the bicycle chain in a transverse direction, and wherein the inner surfaces face each other;
    a pair of inner plates; and
    a connecting pin assembly connecting the pair of outer plates with the pair of inner plates, wherein the connecting pin assembly comprises:
       a first rocker pin;
       a second rocker pin; and
       a center pin between the first rocker pin and the second rocker pin in a longitudinal direction and comprising a pair of opposing transverse ends, wherein the inner surfaces of the pair of outer plates cover the opposing transverse ends of the center pin and constrain the center pin in the transverse direction.

11. The bicycle chain of claim 10, wherein a length of the center pin in the transverse direction is less than a distance between the outer surfaces of the outer plates.

12. The bicycle chain of claim 10, wherein the first rocker pin extends between the pair of outer plates and is fixedly connected to the pair of outer plates, wherein the second rocker pin extends between the pair of inner plates, and wherein a length of the second rocker pin in the transverse direction is less than the width of the bicycle chain.

13. The bicycle of claim 12, wherein the second rocker pin is fixedly connected to the pair of inner plates.

14. The bicycle chain of claim 10, wherein:
    the first rocker pin comprises a first engagement face;
    the second rocker pin comprises a second engagement face;
    the center pin comprises a first center engagement face configured to engage the first engagement face of the first rocker pin and a second center engagement face configured to engage the second engagement face of the second rocker pin; and
    the first engagement face, the second engagement face, the first center engagement face, and the second center engagement face each comprise a non-linear profile.

15. A bicycle chain comprising:
    a pair of outer plates elongated in a longitudinal direction, wherein the pair of outer plates comprises outer surfaces and inner surfaces, wherein the outer surfaces are outermost surfaces of the bicycle chain in a transverse direction, and wherein the inner surfaces face each other;
    a pair of inner plates at least partially between the inner surfaces of the pair of outer plates; and
    a connecting pin assembly connecting the pair of outer plates with the pair of inner plates, wherein the connecting pin assembly comprises:
       a first rocker pin extending between the pair of outer plates, wherein the first rocker pin is fixedly connected to the pair of outer plates;
       a second rocker pin extending between the pair of inner plates; and
       a center pin between the first rocker pin and the second rocker pin in the longitudinal direction, wherein the center pin is not fixed to the pair of inner plates and is not fixed to the pair of outer plates.

16. The bicycle chain of claim 15, wherein a length of the center pin in the transverse direction is less than a length of the first rocker pin in the transverse direction.

17. The bicycle chain of claim 15, wherein a length of the center pin in the transverse direction is less than a distance between the outer surfaces of the pair of outer plates.

18. The bicycle chain of claim 15, wherein:
    the first rocker pin comprises a first engagement face;
    the second rocker pin comprises a second engagement face;
    the center pin comprises a first center engagement face configured to engage the first engagement face of the first rocker pin and a second center engagement face configured to engage the second engagement face of the second rocker pin; and the first engagement face, the second engagement face, the first center engagement face, and the second center engagement face each comprise a non-linear profile.

19. The bicycle chain of claim 15, wherein the second rocker pin is not fixed to the pair of inner plates and is not fixed to the pair of outer plates.

20. The bicycle chain of claim 15, wherein the inner surfaces of the pair of outer plates cover opposing transverse ends of the center pin in the transverse direction and constrain the center pin in the transverse direction.

* * * * *